UNITED STATES PATENT OFFICE 2,566,203

DIMERIZATION OF METHACRYLONITRILE TO ALPHA-METHYLENE-DELTA-METHYL-ADIPONITRILE

Milton J. Hogsed, Wilmington, Del., assignor to E. I. du Pont de Nemours & Company, Wilmington, Del., a corporation of Delaware No Drawing. Application April 26, 1950, Serial No. 158,325

4 Claims. (Cl. 260—465.8)

This invention relates to organic nitriles and more particularly to a novel and improved process for the preparation of the open-chain unsaturated dinitrile, alpha-methylene-delta-methyladiponitrile.

The hitherto known method for the dimerization of methacrylonitrile by heating this nitrile in the liquid phase for a period of about fourteen hours to temperatures in the range 160 to 275° C. and in the presence of a polymerization inhibitor gave low yields of up to 14% of a dimeric product boiling at 128–130° C. at 24 mm. (U. S. patent to Howk 2,232,785). The dimeric product was stated to be presumably the nitrile of alpha, alpha'-dimethyldihydromuconic acid. It is further stated in said Patent 2,232,785 that when the reaction was carried out under the same conditions for a shorter period of time of 6 to 8 hours, a lower yield of this dimeric product was obtained.

The dimeric product obtained under the conditions of the aforesaid Patent 2,232,785 has been found to be a mixture of isomers, of which one is alpha-methylene-delta-methyladiponitrile. Furthermore, this mixture of isomers has been found to contain substantial proportions of about 40% of cyclic compounds containing no olefinic unsaturation and believed to be isomeric dimethyldicyanocyclobutanes.

The heating of acrylonitrile at temperatures of about 300° C. in the presence of a polymerization inhibitor is known to produce small yields of about 5% of the cyclic dimer of acrylonitrile. However, when acrylonitrile is heated above 300° C. extensive carbonaceous residues are formed. (J. A. C. S. 71, 324 (1949)).

It is an object of this invention to provide a method for producing the open-chain unsaturated dinitrile, alpha-methylene-delta-methyladiponitrile. A further object is to provide a method for producing the open-chain dimer, alpha-methylene-delta-methyladiponitrile, from methacrylonitrile in good yields with only negligible yields of the less desirable saturated cyclic dimers. Another object is to provide a novel and improved process for the dimerization of methacrylonitrile under conditions by which the course of the dimerization is radically changed to produce good yields of the open-chain unsaturated dimer substantially free from cyclic dimers. Other objects will appear hereinafter.

These objects are accomplished by the following invention which comprises heating methacrylonitrile free from a polymerization initiator at a temperature within the range of 300° to 400° C. for a period of time not substantially exceeding 15 minutes and under a pressure sufficient to maintain a liquid phase.

The process of this invention can be carried out in the presence or absence of a solvent or diluent. However, it is generally desirable to employ a solvent such as xylene or butyl acetate, or a diluent such as water. Water is preferred as a diluent since it is a good heat exchanger and also has a beneficial effect on the reaction, inhibiting the formation of higher polymers and increasing the yield of the dimer.

Exceptionally good results are obtained when the heating of the methacrylonitrile is carried out in the presence of water and in a continuous process in which methacrylonitrile is heated to a temperature of 325° to 400° C. for extremely short periods of time, i. e., periods ranging from 1 to 10 minutes.

The dimerization of methacrylonitrile can be accomplished in the presence of a polymerization inhibitor, but the inhibitor is not essential if oxygen is excluded from the reaction system.

In the preferred continuous method of carrying out this invention a mixture of methacrylonitrile and water, in proportions ranging from about one to ten moles of water per mole of methacrylonitrile, is passed through a reaction tube at a temperature of 325° to 400° C. under a pressure sufficient to maintain at least part of the reaction mixture in the liquid phase, e. g., under pressures of 175 to 1000 atm., at a rate sufficient to provide a contact time of the reaction mixture in the heated zone of the reaction tube of from 0.5 to 10 minutes, preferably 1.0 to 7.5 minutes. After emerging from the reaction tube the reaction mixture is collected and then separated into its component parts by conventional means, e. g., by fractional distillation.

In another embodiment of this invention which is suitable for batch operation, methacrylonitrile is heated in a reaction vessel capable of withstanding the autogenous pressure developed in the reaction in the presence or absence of an inert diluent or solvent, e. g., water or xylene, at a temperature of 300° to 325° C. for a period of time not exceeding about 15 minutes. Operating times less than 15 minutes can be used in this batch type process. However, since the minimum time of heating in a batch process is controlled by the efficiency of the heating and cooling means available, times much less than 10 minutes are not practical. After cooling the reaction mixture, the dimeric product is separated from unreacted methacrylonitrile, solvent, and higher boiling materials by fractional distillation.

In order to remove oxygen from the reaction system it is preferable to sweep out the reactor with an inert gas such as nitrogen prior to charging the reactants. In the continuous process this can also be done conveniently by flushing the reaction tube with water before charging the methacrylonitrile. In the batch process it is also preferable to sweep out the free space above the reaction mixture in the pressure vessel with nitrogen immediately before closing it and beginning the heating.

The methacrylonitrile used in the process of this invention can be the technical grade commonly available; it need not be specially purified. If the methacrylonitrile contains a small amount of a polymerization inhibitor such as hydroquinone, it is not necessary to remove the inhibitor before subjecting it to the dimerization conditions of this invention.

The process of this invention is illustrated in further detail by the following examples in which the proportions of ingredients are expressed in parts by weight unless otherwise noted.

*Example I*

A pressure reactor is swept out with nitrogen, charged with a mixture of 150 parts of methacrylonitrile, 70 parts of xylene, and 1 part of hydroquinone, and the free space in the reactor again swept out with nitrogen. The reactor is then closed and heated at 310° C. for 15 minutes. After cooling, the crude reaction mixture is subjected to fractional distillation. After 97 parts of unreacted methacrylonitrile and xylene are removed there are obtained 2.5 parts of saturated cyclic dimer boiling at 120–145° C./28 mm., $n_D^{25}$ 1.4518, and 31 parts of the open-chain dimer, alpha-methylene-delta-methyladiponitrile, boiling at 145–155° C./28 mm., $n_D^{25}$ 1.4510. The remainder of the reaction mixture is a higher boiling residue composed of trimers, tetramers, and still higher boiling materials.

*Example II*

A pressure reactor is charged in the same way as in Example I with 150 parts of methacrylonitrile, 50 parts of water, and 1 part of hydroquinone and heated under autogenous pressure at 310° C. for 15 minutes. After cooling, the crude reaction mixture, which amounts to 190 parts, is fractionally distilled. After separation of 39 parts of water and 3.2 parts of unreacted methacrylonitrile there are obtained: 2.5 parts of a fraction boiling up to 145° C. at 26 mm., which is cyclic dimer; and 35 parts of a fraction boiling at 145–152° C. at 26 mm., which is the open-chain dimer alpha-methylene-delta-methyladiponitrile. The remainder of the reaction mixture consists of higher boiling residues which are trimers and higher boiling materials. In this example there is a total conversion of 98% of the methacrylonitrile and the yield of the open-chain dimer is 23.8%.

*Example III*

Into a section of stainless steel tubing having an internal diameter of 0.125 in. and a volume of 60 cc. and which is maintained at a temperature of 350° C. there is charged a mixture of methacrylonitrile and water at a rate of 266 parts of methacrylonitrile and 700 parts of water per hour under a pressure of 600 atm. Under these conditions the contact time of the reaction mixture is approximately 3.8 minutes, i. e., the reactants are at a temperature of 350° C. under a pressure of 600 atm. for 3.8 minutes. Upon emerging from the reaction tube the crude reaction mixture is collected and fractionally distilled. There are obtained, after removal of unreacted methacrylonitrile and water, 3.2 parts of cyclic dimer boiling at 95° C. at 5 mm., 60 parts of alpha-methylene-delta-methyladiponitrile boiling at 113–120° C. at 5 mm., and 45.4 parts of higher boiling residues per hour of operation. These fractions correspond to a total conversion of methacrylonitrile of 40.7% and the yield of the open-chain dimer amounts to 55.2%, while the cyclic dimer amounts to only 3.1% of the total methacrylonitrile converted.

*Example IV*

Into a pressure reactor of stainless steel tubing having an internal diameter of 0.423 in. and a volume of 1,555 cc. heated at 340° C. there is charged a mixture of methacrylonitrile and water at a rate of 3,580 parts of methacrylonitrile and 3000 parts of water per hour under a pressure of 200 atm. Under these conditions the contact time of the reaction mixture in the heated reaction zone is 7.5 minutes. Fractional distillation of the effluent reaction mixture yields, after removal of unreacted methacrylonitrile and water, 802 parts of alpha-methylene-delta-methyladiponitrile and 298 parts of higher boiling residues per hour of operation. These products correspond to a total methacrylonitrile conversion of 30.7%, and the yield of the open chain dimer is 72.8%. The amount of cyclic dimer formed under these conditions is too small to isolate.

As indicated previously the process of this invention can be carried out in the absence or presence of inert diluents or solvents. Any organic solvent which is nonreactive with methacrylonitrile can be used as a reaction medium. Suitable compounds of this type include hydrocarbons such as benzene, toluene, cyclohexane, and octane; esters such as ethyl acetate and butyl acetate; ethers such as dioxane, etc. These solvents have no influence on the extent of conversion of the methacrylonitrile but they improve the yield of open chain dimer significantly by reducing the conversion of methacrylonitrile to higher boiling materials. Water is an especially preferred diluent since it has good heat-transfer characteristics in addition to its ability to reduce formation of higher polymers.

The hydroquinone used in the examples can be replaced, if desired, with other conventional polymerization inhibitors. Such inhibitors include, for example, copper resinate, the naphthyl amines, beta-naphthol, and the like.

The process of this invention provides an unusually high yield of the open-chain unsaturated dimer of methacrylonitrile with only negligible quantities of the isomeric cyclic dimers. In contrast to the prior art method, the process of the present invention gives yields of the open-chain dimer, alpha-methylene-delta-methyladiponitrile, amounting to as high as 72% and with the total yield of isomeric cyclic dimers amounting to less than 5%.

This particular unsaturated dinitrile, alpha-methylene-delta-methyladiponitrile, is of special value as a chemical intermediate, for example, for hydrogenation to the saturated diamine, which is in turn an intermediate in the formation of highly useful polyamides.

As many apparently widely different embodiments of this invention may be made without departing from the spirit and scope thereof, it is to be understood that this invention is not limited to the specific embodiments thereof except as defined in the appended claims.

I claim:

1. A process for the preparation of alpha-methylene-delta-methyladiponitrile which comprises heating methacrylonitrile free from a polymerization initiator at a temperature within the range of 300° to 400° C. for a period of time not substantially exceeding 15 minutes and under a pressure sufficient to maintain a liquid phase, and separating from the reaction mixture alpha-methylene-delta-methyladiponitrile.

2. A process for the preparation of alpha-methylene-delta-methyladiponitrile which comprises heating methacrylonitrile in the presence of a polymerization inhibitor at a temperature within the range of 300° to 400° C. for a period of time not substantially exceeding 15 minutes and under a pressure sufficient to maintain a liquid phase, and separating from the reaction mixture alpha - methylene - delta - methyladiponitrile.

3. A process for the preparation of alpha-methylene-delta-methyladiponitrile which comprises heating methacrylonitrile free from a polymerization initiator in an inert solvent, at a temperature within the range of 300° to 400° C. for a period of time not substantially exceeding 15 minutes and under a pressure sufficient to maintain a liquid phase, and separating from the reaction mixture alpha-methylene-delta-methyladiponitrile.

4. A process for the preparation of alpha-methylene-delta-methyladiponitrile which comprises heating methacrylonitrile free from a polymerization initiator in the presence of water, at a temperature within the range of 300° to 400° C. for a period of time not substantially exceeding 15 minutes and under a pressure sufficient to maintain a liquid phase, and separating from the reaction mixture alpha-methylene-delta-methyladiponitrile.

MILTON J. HOGSED.

REFERENCES CITED

The following references are of record in the file of this patent:

UNITED STATES PATENTS

| Number | Name | Date |
|---|---|---|
| 2,232,785 | Howk | Feb. 25, 1941 |
| 2,244,645 | Jacobson | June 3, 1941 |
| 2,352,515 | Bruson | June 27, 1944 |
| 2,439,308 | Leekley | Apr. 6, 1948 |